United States Patent [19]

Fenn et al.

[11] Patent Number: 4,542,293
[45] Date of Patent: Sep. 17, 1985

[54] PROCESS AND APPARATUS FOR CHANGING THE ENERGY OF CHARGED PARTICLES CONTAINED IN A GASEOUS MEDIUM

[75] Inventors: John B. Fenn, Branford, Conn.; Masamichi Yamashita, Tokyo, Japan; Craig Whitehouse, Branford, Conn.

[73] Assignee: Yale University, New Haven, Conn.

[21] Appl. No.: 486,642

[22] Filed: Apr. 20, 1983

[51] Int. Cl.⁴ .................... B01D 59/44; H01J 49/00
[52] U.S. Cl. ................................... 250/288; 328/233
[58] Field of Search ............... 250/288, 289, 423 R, 250/423 F, 424, 425; 313/359.1, 360.1, 361.1, 362.1; 328/233

[56] References Cited

U.S. PATENT DOCUMENTS

| | | |
|---|---|---|
| 4,023,398 | 3/1975 | French . |
| 4,121,099 | 4/1977 | French . |
| 4,137,750 | 4/1977 | French . |
| 4,144,451 | 3/1979 | Kambara ............................ 250/289 |
| 4,209,696 | 2/1979 | Fite . |
| 4,220,545 | 9/1980 | Franzen et al. ................. 250/423 R |
| 4,318,028 | 3/1982 | Perel et al. ...................... 250/423 R |
| 4,321,467 | 3/1982 | Buttrill, Jr. ..................... 250/423 R |

FOREIGN PATENT DOCUMENTS 1584459 2/1981 United Kingdom .

OTHER PUBLICATIONS

Malcolm Dole, L. L. Mack, and R. L. Hines; "Molecular Beams of Macroions", 9/1/68, vol. 49, No. 5, The Journal of Chemical Physics.
K. T. Whitby, "Generator for Producing High Concentrations of Small Ions", 12/61, vol. 32, No. 12, The Review of Scientific Instruments.
Arthur Kantrowitz and Jerry Grey, "A High Intensity Source for the Molecular Beam, Pt. 1 Theoretical", 5/51, vol. 22, No. 5, The Review of Scientific Instruments.

Primary Examiner—Alfred E. Smith
Assistant Examiner—Vincent J. Lemmo
Attorney, Agent, or Firm—Birch, Stewart, Kolasch & Birch

[57] ABSTRACT

A method of changing the energy of charged particles contained in a gas comprises allowing the gas to flow into a region of reduced pressure through a tube like member so that viscous forces exerted on the charged particles by the flowing gas molecules determine the kinetic energy of the charged particles. A potential gradient is maintained along the length of the tube so that the potential energy of the charged particles is changed as they pass through the tube. At the end of the tube a free jet expansion occurs so that the kinetic energy of the charged particles is no longer determined by the flowing gas, so that they can be accelerated to any desired kinetic energy by means of another potential gradient.

The invention can be used to interface any high pressure ion source to a magnetic sector mass spectrometer, or to permit the operation of an electrospray ion source with an earthed inlet capillary with either a quadrupole or a magnetic sector mass spectrometer.

38 Claims, 4 Drawing Figures

PROCESS AND APPARATUS FOR CHANGING THE ENERGY OF CHARGED PARTICLES CONTAINED IN A GASEOUS MEDIUM

TECHNICAL FIELD

This invention relates to a method of changing the energy of charged particles which are contained in a gaseous medium, and especially of ions generated in a high pressure ion source for a mass spectrometer in order to match the energy of the particles produced by the source with that required by the mass analyser.

BACKGROUND ART

There are many types of ion source in which, because of their principle of operation, it is impractical to vary the energy possesed by the ions formed over more than a very small range, for example, atmospheric pressure ionization sources for mass spectrometers. A problem frequently exists, therefore, in matching the energy of the ions produced with the value required by the mass analyser, especially in the case of magnetic sector mass spectrometers. The problem is also encountered in other fields apart from mass spectrometry, and although the present invention will be described with particular reference to mass spectrometry, it will be understood that it is equally capable of application in other fields where a similar problem is encountered.

In general, the potential energy possessed by an ion is determined by the electrical potential, relative to earth, at which it is formed, and in a conventional ion source for a magnetic sector mass spectrometer the ion is usually generated at a high potential and its potential energy is converted to kinetic energy by passing the ion through a slit at earth potential. The law of conservation of energy states that the sum of the potential and kinetic energies must be constant, and it is therefore possible to accelerate or retard the ion by means of passing it through slits at any electrical potential up to that at which it was formed, but it is not possible to increase the energy of the ion above the potential at which it was formed. Clearly, if an attempt was made to pass the ion through a slit at a higher potential, its kinetic energy would be reduced to zero before it reached the slit, and it would not pass through. However, the total energy possessed by the ion can be changed if the ion collides with, for example, an inert gas molecule. In this case, the sum of the kinetic energies of the ion and the molecule can be redistributed between the two particles dependent on their relative masses and direction of motion. Usually, because the average kinetic energy possessed by gas molecules at room temperature is very much less than that of an ion accelerated by a potential gradient of several kV, the effect of frequent collisions with gas molecules, assuming that the ion undergoes no chemical change, is that its kinetic energy is reduced.

A conventional magnetic sector mass spectrometer selects ions on the basis of their momentum/charge ratios, in contrast with a quadrupole spectrometer, which selects on the basis of mass/charge ratios. Consequently the ions for mass analysis must be injected into a magnetic sector instrument at a constant velocity, which implies a constant kinetic energy, and for various reasons this must generally be in the range 2–8keV in a high performance instrument. In a conventional ion source, this is easily achieved by forming the ion in a substantially field free region maintained at the necessary potential, and accelerating the ion by passing it through an earthed slit at the entrance of the mass analyser. However, if the ion undergoes collisions with gas molecules after its formation, its kinetic energy will be changed, and this will degrade the resolution of the spectrometer.

There exist a number of types of ion sources with which it is very difficult to produce ions with a narrow range of kinetic energies at several keV, such as are required by a magnetic sector instrument. These include sources which operate at high gas pressures, such as atmospheric pressure ionization sources and electrospray ionization sources. Sources of this type are often capable of producing ions which are largely unfragmented from high molecular weight biochemicals which can be difficult to ionize by conventional methods, and are often appropriate for combination with a liquid chromatograph. The combination of sources of this type with magnetic sector spectrometers is therefore of considerable importance, because it is often important to obtain information which only a high resolution magnetic sector spectrometer can yield from compounds which can often only be ionized without fragmentation by a source of the type described, especially when the sample cannot easily be separated into pure components for mass spectral analysis by a technique like field desorption or neutral atom bombardment. The process of electrospray ionization, which is capable of producing unfragmented ions of high molecular weight from thermally unstable or involatile biochemicals, will now be described in greater detail so that as an example, the use of the invention with an electrospray source can be described. It is based on the work of M. Dole et al (described, for example in Journal of Chemical Physics, 1968, volume 49, p2240). A solution containing the sample to be ionized is sprayed from a capillary tube into a region containing an inert gas at approximately atmospheric pressure, towards a small orifice in a plate which leads into the vacuum system of the mass spectrometer. A high electrical potential is applied between the spraying capillary and the walls of the chamber containing the inert gas (including the plate with the small orifice). A separation device, usually a nozzle skimmer system like that described by Kantowitz and Gray in the Review of Scientific Instruments, 1951, Vol. 22 p328, is placed between the region of atmospheric pressure and the vacuum system in order to reduce the quantity of gas which flows into the vacuum system and to produce a better collimated molecular beam.

The principle of operation of the electrospray source is as follows. The solution containing the sample is slowly displaced through the capillary so that a jet of liquid is produced. The electric field in the chamber results in the jet becoming charged, and as the solvent evaporates it breaks up into a series of charged droplets. The applicants believe that sample ions, clustered with a certain number of solvent molecules, are then ejected from the evaporating droplets, and these solvated ions pass through the small orifice into the mass spectrometer. An additional pressure reduction stage, comprising a separately pumped chamber and a second nozzle skimmer system, can be incorporated between the high pressure region of the source and the mass spectrometer. Electrospray ion sources for mass spectrometers incorporating these features are known, and are described, for example, in U.S. Pat. No. 4,209,696.

A problem which is encountered in most prior art sources of this type, and with other forms of mass spectrometer ion sources which operate at high pressure such as atmospheric pressure ionization sources, is that the ions formed are solvated, and consist of the desired sample ion clustered with a variable number of solvent molecules or molecules of other condensable material The presence of this clustering greatly complicates the interpretation of the mass spectrum, and can sometimes make the determination of the true molecular weight of the sample uncertain. In the case of electrospray type ion sources, the use of the technique described in our copending U.S. patent application Ser. No. 486,645 entitled "Method and Apparatus for the Mass Spectrometric Analysis of Solutions", can be used to provide a controllable amount of declustering and to completely desolvate the ions if desired.

However, the passage of the ions through a gas at atmospheric pressure greatly reduces their kinetic energy, and if the orifice through which they pass into the vacuum system is maintained at earth potential, the total energy they possess when they enter the vacuum system will be in the region of a few eV only, even though the potential of the inlet capillary in the source may have been several kV. This energy is of course satisfactory for a quadrupole mass analyser, but it is impossible with prior art sources to accelerate the ions again to a kinetic energy which is suitable for a magnetic sector mass spectrometer. It is of course possible to maintain the orifice at the accelerating voltage required by the spectrometer so that the ions still have sufficient potential energy to be reaccelerated to the kinetic energy required, but this in turn requires the inlet capillary to be maintained at a still higher voltage, and problems of preventing arcing in the system and supplying the inert gas at a high voltage are greatly increased. The construction of the source and pumping system are also complicated by the presence of the high accelerating potential on the electrospray chamber walls, and the presence of gas in the vacuum system in contact with the walls at a pressure of $10^{-3}$ torr or so where many gases are electrically conductive. A more fundamental problem also exists in the difficulty of focussing the emerging ions of low and variable kinetic energy which are travelling in a wide range of directions, in an efficient way which does not increase the energy spread of the ions still further and degrade the performance of the spectrometer. One way that has been proposed to overcome some of these problems, described in U.S. Pat. No. 4,121,099, involves the provision of electrostatic lens elements in the vacuum system immediately behind the orifice in the free jet expansion which exert a strong focussing action on the ions in a region where the gas pressure is still sufficiently high that collisions with the inert gas molecules still limit the total amount of kinetic energy that can be transferred by the field, thus reducing the spread in directions of motion of the emerging ions. Provision can also be made slightly further away from the orifice to accelerate the ions so that they are at least partly desolvated by the increased energy of the collisions with the gas molecules in the expanding jet, but it is clearly difficult to control either of these processes effectively especially in combination, and especially if the ions have to be accelerated to several keV for a magnetic sector instrument. Further, it will also be seen that even to produce ions with a potential energy of a few eV only it is necessary to operate the source with a high potential on the inlet capillary, and clearly this makes it very difficult to directly connect a liquid chromatograph to the source, because this too would have to be operated at the potential of the inlet capillary. Very similar problems are encountered in all ion sources which involve gases at relatively high pressures, including atmosphere pressure ionization sources involving various ionization processes, and consequently the advantages that this type of source can offer for combined liquid chromatography and mass spectrometry, and for the ionization of thermally unstable and involatile samples have not been fully exploited.

It is an object of the present invention therefore to provide method of changing the energy possessed by ions passing from a region of high gas pressure as they emerge into a lower pressure region, substantially independently of the initial potential energy possessed by the ion, and especially to provide a method of accelerating ions which have both low potential and kinetic energies to a value suitable for a magnetic sector mass spectrometer. It is another object of the invention to provide a mass spectrometer incorporating a high pressure ionization source such as an electrospray ionization source which incorporates a means for accelerating the ions to the energy required for the analyser of the spectrometer, independent of the potential applied to the orifice between the source and the vacuum system of the spectrometer. It is another object of the invention to provide an electrospray or similar type of ion source which can be fitted to either a magnetic sector or a quadrupole mass analyser with an entrance orifice maintained at earth potential, and which can be operated with the inlet capillary of the source also at earth potential, therefore greatly simplifying the connection of a liquid chromatograph.

SUMMARY OF THE INVENTION

In accordance with one aspect of this invention there is provided a method of increasing the energy of charged particles contained in a gas comprising:

(a) Maintaining a flow of said gas containing said charged particles from a first region through a tube like member into a second region where the pressure is maintained substantially lower than in said first region so that collisions between the molecules of said gas and said charged particles in said tube like member substantially determine the kinetic energy possessed by said charged particles;

(b) Providing along at least part of said tube-like member an electrical potential gradient in a direction which, in the absence of said flow of gas, would serve to reduce the kinetic energy of said charged particles passing along said tube-like member from said first to said second region, thereby increasing the potential energy of said charged particles;

(c) Permitting a free expansion of said gas containing said charged particles at the outlet of said tube like member into said second region so that the kinetic energy of the said charged particles is no longer determined by collisions with molecules of said gas; and (d) Accelerating said charged particles to a desired kinetic energy by allowing them to pass through an electrical potential defining means maintained at potential less than that existing at the outlet of the said tube like member.

In a preferred aspect of the method of the invention, there is provided an additional pressure reduction stage comprising the step of directing the flow of gas from the outlet of said tube like member towards an orifice in a skimmer spaced apart from and disposed opposite to said outlet, and said orifice leading to a third region maintained at a substantially lower pressure than that in said second region, and said orifice in said apex further serving as said electrical potential defining means.

In accordance with a further aspect of this invention there is provided an apparatus for increasing the energy of charged particles contained in a gas comprising:

(a) a first chamber adapted to contain a gas containing charged particles having a conductive wall through which is fitted a tube like member with its inlet flush with said conductive wall;

(b) a second chamber, one wall of which is formed by said conductive wall, into which said tube like member extends, and means for maintaining the ambient pressure in said second chamber substantially below that in said first chamber;

(c) a first plate - like electrode disposed parallel to and spaced apart from said conductive wall and at least part way along said tube like member;

(d) a second plate like electrode spaced apart from and disposed parallel to said first plate like electrode, disposed further from said conductive wall and having therein a slit or orifice aligned with said tube like member and through which at least some of the said charged particles can pass after they leave the said tube like member;

(e) means for maintaining a first potential difference between said conductive wall and said first plate like electrode which is at least as great as that required to increase the potential energy of said charged particles to a desired level during passage of said particles along said tubelike member from said first to said second chamber.

(f) means for maintaining a second potential difference between said first plate like electrode and said second plate like electrode equal to that required to accelerate said charged particles to a desired kinetic energy as they pass through said slit or orifice in said second plate like electrode.

According to a preferred aspect of the invention, said second plate like electrode comprises a second conductive wall of said second chamber, and contains an orifice in the apex of a hollow conical frustum mounted on said second conductive wall with its apex facing towards and aligned with the outlet of said tube like member, said orifice in said apex leading to a third chamber provided with means for maintaining the ambient pressure substantially lower than that in said second chamber.

Preferably the charged particles will consist of ions characteristic of a sample which have been produced by an atmospheric pressure ionization or electrospray type ion source, and the gas will be that present in the high pressure region of the source. In the case of the electrospray type source described above, the tube like member may conveniently consist of an electrically insulating capillary tube fitted to the rear of the orifice which leads from the high pressure region of the source to reduced pressure region. The bore and length of the capillary are selected to limit the flow of gas into the evaluated region so that the pressure can be maintained substantially at $10^{-3}$ torr or better. In general, the capillary should be as short as possible, consistent with maintaining the required potential gradient along it, and as large a bore as possible, subject to the capacity of the pump used to evacuate the second region. A glass or quartz capillary is suitable. The flow through the tube should be fast enough to ensure viscous flow throughout its length so that there are sufficient collisions between the charged particles and the gas molecules to determine the kinetic energy of the charged particles as required by the invention, and to further ensure that the flow of gas is choked, that is, at sonic velocity, at the exit of the tube. In this case, assuming the gas to be nitrogen at 20° C., the translational energy of the molecules at the end of the capillary will be about 0.04 eV, and in the subsequent free jet expansion this can about double. Thus the maximum kinetic energy that can be imparted to an ion during its passage through the tube is only in the region of several eV even if the mass of the ion is several thousand atomic mass units. Thus the invention enables the potential energy of the ions to be increased without introducing a spread of kinetic energy of more than about 1 eV on average, which means that it is suitable for accelerating ions for introduction into a magnetic sector mass spectrometer. It is possible to move the ions through a potential gradient of 15 kV or more using 0.25 mm internal diameter capillary about 5 cm long with a flow of gas (nitrogen) of about 100 at.cc.min.$^{-1}$.

It will be appreciated that the tube should be made of an electrical insulator in order that the potential gradient will exist inside the tube and the potential energy of the ions can be gradually increased as they are pushed through the tube by collisions with the gas molecules. Also, an electrically conductive tube would result in the discharge of most ions which came into contact with it. A glass or quartz tube is usually satisfactory. Some loss of efficiency in the transfer of ions may occur due to discharge or reaction on the walls, especially if there is some water present or the surface of the tube which might cause charge leakage close to the surface. This can be reduced by heating the tube, at the risk of causing some thermal degradation of unstable ions passing through it. However, it will be appreciated that a conventional coiled heater made from a metallic wire cannot be used because of the need to maintain the potential gradient along the tube, and it is necessary to rely on a less conventional form of heating. In many cases the heat conducted along the tube from a heated end plate on which the tube is mounted will be sufficient.

It is also possible to combine the invention with a skimmer leading into a region of further reduced pressure, and in this case the conical frustum should be made of an electrical conductor and should be maintained substantially at the potential needed to accelerate the ions to the desired kinetic energy as they pass through into the third region beyond the skimmer in which a mass spectrometer can conveniently be situated. This pressure reduction process is particularly valuable when the invention is used to interface a mass spectrometer to one of the types of ion source previously described which are particularly useful for producing ions from high molecular weight biochemicals. Additional electrostatic focussing lenses can also be positioned between the tube outlet and the skimmer to focus the beam of ions and improve the transfer efficiency of ions still further.

According to another aspect of the invention there is provided a mass spectrometer equipped with an ion source which is capable of operating at a pressure greater than 10 torr, said ion source being interfaced to the mass analyser of the spectrometer by means of a device constructed substantially according to the invention in order to change the energy of the ions produced by said source to the value required for mass analysis by said mass analyser.

In this way, the invention provides a convenient method of using a high pressure ionization source with a magnetic sector mass spectrometer without the need to operate the source and its inlet system at the accelerating voltage of the spectrometer, because the potential energy of the ions generated by the source can be increased to the value needed for the spectrometer even when the total energy they possess as they leave the source is very low. In addition, as explained, the process introduces only a small energy spread to the ions, which does not significantly degrade the performance of the mass spectrometer. It is preferable to use the version of the invention incorporating the skimmer, so that the pumped region where the free jet expansion at the end of the tube like member takes place serves as an intermediate pressure reduction stage, as used in some prior art electrospray source systems.

According to a still further aspect of the invention there is provided a mass spectrometer incorporating any known mass analyser equipped with an electrospray type ion source substantially as described which is interfaced to the mass analyser of the spectrometer by means of apparatus constructed according to the invention. Preferably the version of the invention incorporating the skimmer should be used in order that the mass analyser of the spectrometer is operated under the highest vacuum conditions. With an instrument of this type, it is possible to operate the inlet capillary of the source at earth potential and provide the potential difference needed to produce the electrospray by maintaining the wall of the source opposite the inlet capillary at a high negative potential (assuming positive ions are to be produced). The potential energy of the ions as they emerge from the exit orifice of the source at a high negative potential can then be increased to the value needed for the mass analyser either a quadrupole or a magnetic sector by means of the invention. In the case of a sector instrument, this may require the ions to travel up a potential gradient of 10–15 kV, but this is not difficult to achieve, as explained previously. The ability of an electrospray mass spectrometer source to operate with an earthed inlet capillary greatly facilitates the connection of a liquid chromatograph, and therefore extends the use of the electrospray source very considerably.

BRIEF DESCRIPTION OF THE DRAWINGS

The invention will now be described in greater detail by reference to the drawings in which.

DETAILED DESCRIPTION OF THE INVENTION

Figure 1:
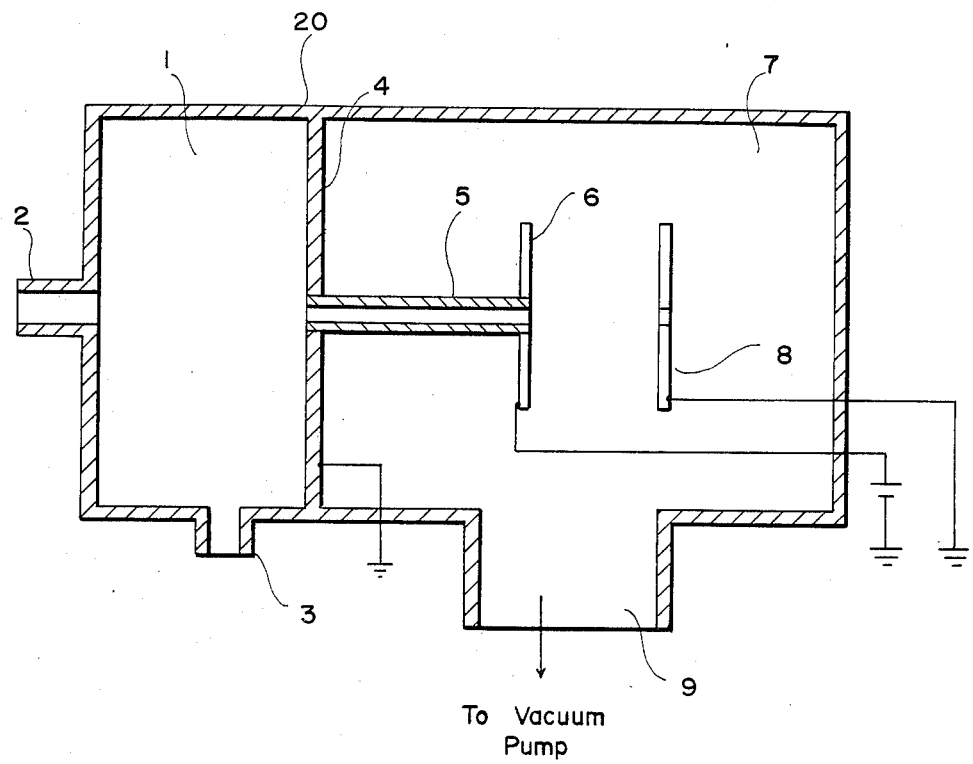
FIG. 1 is a simplified sectional view of apparatus constucted according to the basic invention.

Referring first to FIG. 1, the gas containing the charged particles is either contained in region 1 of housing 20, or introduced through inlet 2 and flows through region 1 to the outlet 3. A conductive wall 4 separates region 1 from region 7, which is maintained at a substantially lower pressure than region 1 by means of a vacuum pump connected to port 9. An insulated tube like member 5 is mounted on wall 4 and supports an electrode 6 at its far end, as shown. The inlet and outlet ends of tube 5 are coated with a conductive film in order to ensure that their electrical potentials remain the same as wall 4 and electrode 6, respectively. A second electrode 8, containing an orifice through which the charged particles can pass, is supported in any convenient way beyond electrode 6 as shown. The pressure in region 1 should be sufficiently high to maintain viscous flow through tube 5, and in most applications it will be atmospheric pressure or greater. The pressure in region 7 should preferably be maintained at $10^{-3}$ torr or less. The tube 5 should generally be as short as possible and have as large a bore as possible, but these parameters are limited by the capacity of the pump connected to region 7. Typically, when region 1 is at atmospheric pressure and region 7 at $10^{-3}$ torr, maintained by a 1000 l.s$^{-1}$. Oil diffusion pump, tube 5 may be a glass tube of 6cm length and 0.225 mm internal diameter. This results in a flow of about 90 at.cc.min$^{-1}$, which is about the maximum that can be pumped at $10^{-3}$ torr by the 1000 l.s.$^{-1}$ pump. Any combination of tube length and bore which would result in a flow of this order may be used, but in general longer capillaries are needed when greater potential gradients are used.

Figure 2:
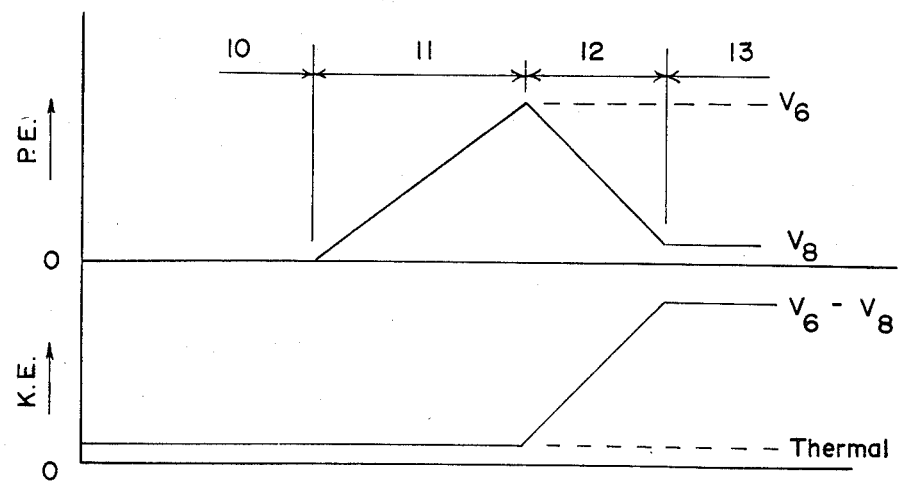
FIG. 2 is a graph showing how the potential energy (PE) and kinetic energy (KE) of the charged particles vary as they pass through the apparatus shown in FIG. 1.

FIG. 2 shows the changes In kinetic energy and potential energy of the charged particles as they move through the apparatus. Denoting the potential on each electrode shown in the figures as $V_x$, where x the reference number of the electrode in the figures, in section 10 of FIG. 2 the charges particles have zero potential energy because the potential $V_4$ and the walls of region 1 are maintained at earth potential. Their kinetic energy, which is due to the thermal motion of the gas molecules, is small, as shown in the lower graph in FIG. 2. As the charged particles pass through tube 5 their kinetic energy remains substantially determined by the thermal motion of the gas molecules as previously explained, but their potential energy gradually rises until it reaches $V_6$ at the end of tube 5. In the subsequent free jet expansion, the kinetic energy of the charged particles is no longer determined by the gas molecules, and the ions are accelerated, with their potential energy being converted into kinetic energy, until they pass through electrode 8 at potential $V_8$, where their kinetic energy becomes $V_6-V_8$ and their potential energy $V_8$. The potentials $V_4$, $V_6$ and $V_8$ are selected according to the acceleration required, and the absolute potentials on electrodes 4 and 8 are also selected to suit the source of the charged particles, which is usually situated in region 1, and the requirements of the device receiving the accelerated ions, usually a mass analyser situated downstream of electrode 8. The greater the potential difference $V_6-V_4$, the longer tube 5 must be, so that the potential gradient the charged particles have to climb is not too great for the viscous forces exerted on them by the flowing gas molecules in tube 5. A tube 6 cm long will permit the charged particles to climb a potential gradient of up to 15 Kv with a flow of 90 at.cc.min$^{-1}$ of nitrogen in tube 5 with a typical transmission efficiency of more than 60%. Additional lens elements can be incorporated between electrodes 6 and 8 if desired in order to focus the ions in the free jet expansion at the end of tube 5.

Figure 3:
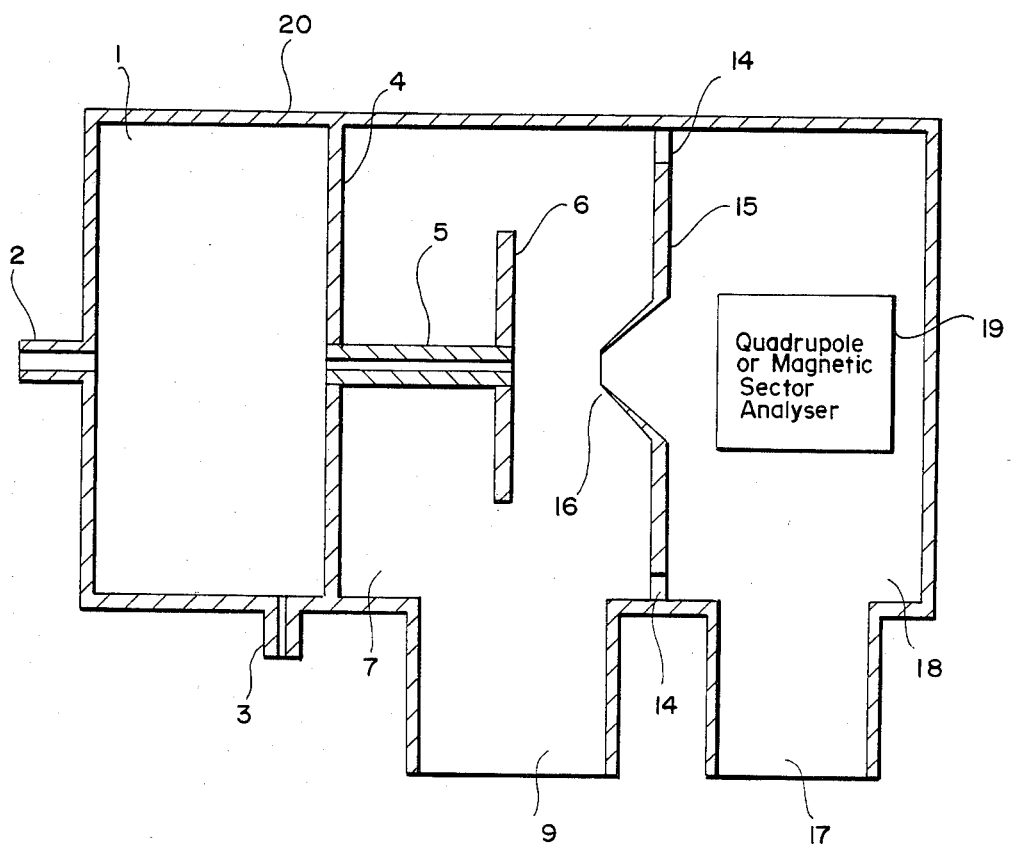
FIG. 3 is a simplified sectional view of apparatus constructed according to the invention which additionally incorporates a skimmer enrichment device.

FIG. 3 shows a version of the invention incorporating a skimmer 16. This consists of an orifice in a hollow conical frustum mounted on conductive wall 15, which is aligned with the axis of tube 5. Wall 15 is mounted on insulators 14, but serves as a barrier between region 7, which is pumped through port 9, and region 18 which is pumped through port 17. With the parameters given earlier, a distance of about 1.5 cm between electrode 6 and the front of skimmer 16 is satisfactory. The diameter of the hole in skimmer 16 is chosen so that the pressure in region 18 can be maintained at about $10^{-5}$ torr (assuming the pressure in region 7 to be $10^{-3}$ torr), with an appropriate vacuum pump attached to port 17. If the Invention is used to couple a high pressure ion source to a mass spectrometer, the mass analyser 19 can be situated in region 18 as shown. In the case of a magnetic sector instrument, region 18 will of course be more extensive than shown in the drawing, and may comprise additional pumping stages.

The potentials applied to the various electrodes may conveniently be those described earlier, with wall 15 and skimmer 16 being maintained at potential $V_8$. Additional electrostatic focussing lenses may be provided on either side of wall 14, and the potential on the skimmer can conveniently be made adjustable so that it can be varied to optimize the transmission of ions into the mass analyser 19. In this case, the entrance aperture of the analyser will be maintained at $V_{19}$, which will be lower than $V_{16}$, and the kinetic energy gained by the ions will be equivalent to $V_6 - V_{19}$. $V_{19}$ may conveniently be earth potential, but in some cases it may be found convenient to make it adjustable, especially if analyser 19 is of the quadrupole type.

It will be appreciated that in the apparatus described in FIGS. 1 and 3, many details concerning the construction of the vacuum housings and the mounting of the various components have been omitted. These are standard features of equipment of this kind, and the detailed design of an embodiment of the invention for any particular purpose will present no difficulty to those skilled in the art.

Figure 4:
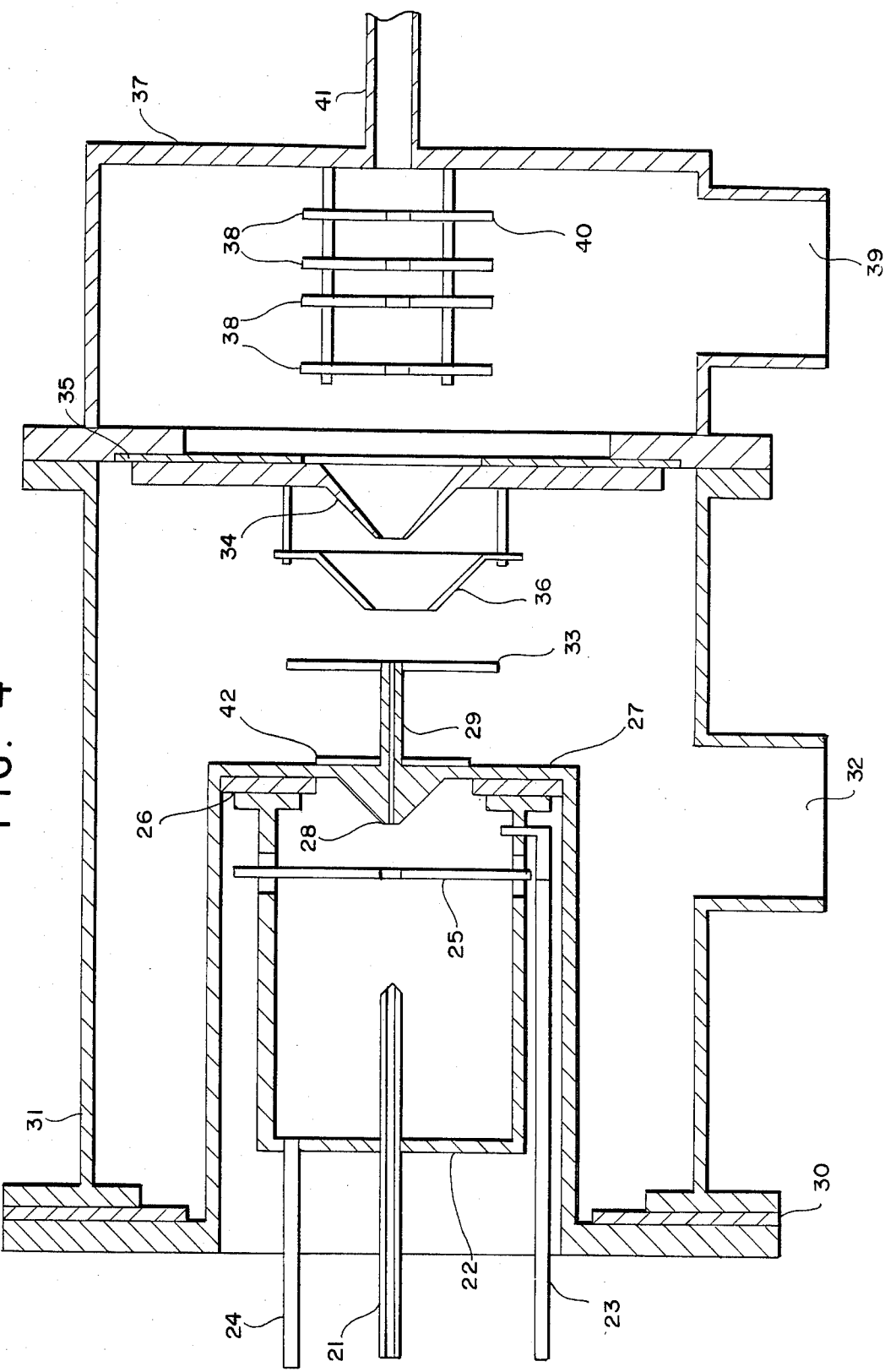
FIG. 4 is a simplified view of the source region of a mass spectrometer with an elecrospray ion source constructed according to the invention.

As an example of the use of the invention, FIG. 4 shows a simplified sectional view of the source section of a magnetic sector mass spectrometer coupled by means of the invention to an electrospray type ion source operated with its inlet capillary at earth potential. The solution containing the sample to be ionized is introduced into the electrospray source inlet capillary 21 into chamber 22 which is maintained at substantially atmospheric pressure by means of a flow of nitrogen (optionally heated) through inlet pipe 23 and outlet pipe 24. The walls of chamber 22 are insulated by means of spacer 26 from re-entrant housing 27, and also from inlet capillary 21, so that the capillary 21 can be earthed and the walls of chamber 22 maintained at a high negative potential. A diaphragm electrode 25 is maintained at an intermediate potential in order to improve the effieciency of the ionization process, and end plate of re-entrant housing 27 which carries a conical skimmer 28 is also maintained at an adjustable potential, close to but not necessarily identical with, that on walls 22. The end plate of re-entrant housing 27 may carry heating means 42 to enable insulated tube 29 to be heated. The details of operation of an electrospray ion-source of this type are described in our copending U.S. patent application, Ser. No. 486,645 entitled "Method and Apparatus for The Mass Spectrometric Analysis of Solutions", but it will be appreciated that any known type of electrospray source can be used. Insulated tube 29 is attached to the rear of the exit orifice in skimmer 28 of the high pressure section of the electrospray source, in accordance with the invention, and extends into a region maintained at a pressure of $10^{-3}$ torr or less in housing 31. A vacuum pump, typically a 1000 l.s.$^{-1}$ diffusion pump, is attached to port 32. The electrospray chamber walls 22 are insulated from housing 31 by an insulated spacer 30. An electrode 33 is attached to the other end of tube 29, as required by the invention. A flange carrying a hollow conical skimmer 34 is insulated from housings 31 and 37 by means of insulating spacer 35, and a conical focussing electrode 36 is provided in housing 31 as required by one version of the invention. Housing 37 is maintained at a lower pressure than housing 31, typically better than $10^{-5}$ torr, by means of another diffusion pump connected to port 39. A set of focussing lenses 38 are also provided, and the entrance slit 40 of a magnetic sector mass spectrometer, which is preferably of adjustable width, is mounted immediately in front of the flight tube 41 which carries the ions to be mass analysed between the poles of the spectrometer magnet. Alternatively, if a double focussing spectrometer is used, the ions may pass first into an electrostatic analyser after passing through slit 40.

The conditions required to accelerate the ions by means of the invention have previously been described, but in the embodiment shown in FIG. 4, the following potentials are typical, assuming the accelerating voltage of the spectrometer is 8 kV.

$V_{21} = 0$ V (earth)
$V_{22} = -6$ kV (adjustable)
$V_{25} = -3$ kV (adjustable)
$V_{27}, V_{28} = -6$ kV
$V_{33} = +8$ kV
$V_{36} = +4$ kV (adjustable)
$V_{34} = +100$ V (adjustable):
$V_{38} =$ that required to optimize transmission
$V_{40} = 0$ V Thus the potential energy of the ions is increased from about $-6$ kV to $+8$ kV as they pass through tube 29, and they are then accelerated to 8 kV kinetic energy between electrode 33 and slit 40 passing through a series of electrodes, the potentials of which can be adjusted to optimize transmission of the ions. If desired at least one of electrodes 38 can be made into a pair of deflector plates between which a small adjustable potential difference is applied in order to deflect the emerging ion beam slightly to compensate for any misalignment of the slits or orifices in the electrodes.

What is claimed is:

1. In a method of increasing the energy of charged particles contained in a gas, the improvement comprising:
   (a) maintaining a flow of said gas containing said charged particles from a first region through a tube-like member into a second region where the pressure is maintained substantially lower than in said first region, said flow being great enough to ensure that collisions between molecules of said gas and said charged particles in said tube-like member substantially determine the kinetic energy possessed by said charged particles;
   (b) providing along at least part of said tube-like member an electrical potential gradient in a direction which in the absence of said flow of gas would serve to reduce the kinetic energy of said charged particles passing along said tube-like member from said first to said second region, thereby increasing the potential energy of said charged particles;

(c) permitting a free expansion of said gas containing said charged particles at the outlet of said tube-like member into said second region, so that the kinetic energy of said charged particles is no longer determined by collisions with molecules of said gas; and (d) accelerating said charged particles to a desired kinetic energy by allowing them to pass through an electrical potential defining means maintained at a potential less than that existing at the outlet of said tube-like member.

2. A method of increasing the energy of charged particles according to claim 1 incorporating an additional pressure reduction stage comprising directing the flow of gas containing said charged particles at the outlet of said tube like member towards an orifice in a skimmer spaced apart from and disposed opposite to said outlet, said orifice leading to a third region maintained at a substantially lower pressure than said second region, and said skimmer also serving as said electrical potential defining means.

3. A method according to claim 1 in which said charged particles are ions formed from a sample to be analysed.

4. A method according to claim 3 in which said ions are formed in an ion source capable of operating at pressures greater than 10 torr which is situated in said first region.

5. A method according to claim 4 in which said ion source is an electrospray ion source.

6. A method according to claim 1 in which a mass spectrometer receives said charged particles after their passage through said electrical potential defining means.

7. A method according to claim 2 in which a mass spectrometer situated in said third region receives said charged particles after their passage through said skimmer.

8. A method according to claim 5 in which the inlet capillary of said electrospray ion source is operated substantially at earth potential.

9. A method according to claim 1 in which the flow of gas is choked at the exit of said tube like member.

10. A method according to claim 1 in which said tube like member is heated.

11. Apparatus for increasing the energy of charged particles contained in a gas comprising:

(a) a first chamber adapted to contain a gas containing charged particles and having a conductive wall through which is fitted a tube-like member with its inlet flush with said conductive wall;

(b) a second chamber, one wall of which is formed by said conductive wall, into which said tube-like member extends, and means for maintaining the ambient pressure in said second chamber substantially below that in said first chamber;

(c) A first plate-like electrode disposed parallel to and spaced apart from said conductive wall and at least part way along said tube-like member;

(d) a second plate-like electrode spaced apart from and disposed parallel to said first plate-like electrode, disposed further from said conductive wall and having therein a slit or orifice aligned with said tube-like member through which at least some of said charged particles can pass after they leave said tube-like member;

(e) means for maintaining a first potential difference between said conductive wall and said first plate-like electrode which is at least as great as that required to increase the potential energy of said charged particles to a desired level during passage of said particles along said tube-like member from said first to said second chamber;

(f) means for maintaining a second potential difference between said first plate-like electrode and said second plate-like electrode equal to that required to accelerate said charged particles to a desired kinetic energy as they pass through said slit or orifice in said second plate-like electrode.

12. Apparatus as claimed in claim 11 further comprising additional pressure reduction means comprising a small orifice in the apex of a hollow conical frustum mounted on a second conductive wall spaced apart from and disposed parallel to said first plate like electrode and with its apex aligned with and facing towards said outlet of said tube like member, said second conductive wall forming a boundary wall of said second chamber and serving as said second plate like electrode, and said orifice leading into a third chamber provided with means for maintaining the ambient pressure in it substantially lower than that in said second chamber.

13. Apparatus according to claim 11 in which said charged particles are ions formed from a sample to be analysed.

14. Apparatus according to claim 13 in which said ions are formed in an ion source capable of operating at pressures greater than 10 torr which is situated in said first region.

15. Apparatus according to claim 14 in which said ion source is an electrospray type ion source.

16. Apparatus according to claim 12 in which said charged particles are ions formed from a sample to be analysed.

17. Apparatus according to claim 16 in which said ions are formed in an ion source capable of operating at pressures greater than 10 torr which is situated in said first chamber.

18. Apparatus according to claim 17 in which said ion source is an electrospray type ion source.

19. Apparatus according to claim 11 in which said tube like member is formed from an electrically insulating material.

20. Apparatus according to claim 19 in which the length of the said tube like member is from 1 to 25 cm and its bore is from 0.1 to 0.3 mm.

21. Apparatus according to claim 11 in which a mass spectrometer receives said charged particles after their passage through said electrical potential defining means.

22. Apparatus according to claim 12 in which a mass spectrometer situated in said third chamber receives said charged particles after their passage into said third chamber.

23. Apparatus according to claim 15 in which the inlet capillary of the electrospray ion source is operated substantially at earth potential.

24. Apparatus according to claim 21 in which the said charged particles are ions produced by an ion source capable of operating at pressures greater than 10 torr situated in said first region.

25. Apparatus according to claim 22 in which said charged particles are ions produced by an ion source capable of operating at pressures greater than 10 torr situated in said first chamber.

26. Apparatus according to claim 24 in which said ion source is an electrospray type ion source.

27. Apparatus according to claim 25 in which said ion source is an electrospray type ion source.

28. Apparatus according to claim 26 in which said electrospray ion source is operated with its inlet capillary substantially at earth potential.

29. Apparatus according to claim 27 in which said electrospray type ion source is operated with its inlet capillary substantially at earth potential.

30. Apparatus according to claim 28 in which said mass spectrometer is of the quadrupole type.

31. Apparatus according to claim 29 in which said mass spectrometer is of the quadrupole type.

32. Apparatus according to claim 24 in which said mass spectrometer incorporates a magnetic sector analyser.

33. Apparatus according to claim 25 in which said mass spectrometer incorporates a magnetic sector analyser 34. Apparatus according to claim 26 in which said mass spectrometer incorporates a magnetic sector analyser.

35. Apparatus according to claim 27 in which said mass spectrometer incorporates a magnetic sector analyser.

36. Apparatus according to claim 28 in which said mass spectrometer incorporates a magnetic sector analyser.

37. Apparatus according to claim 29 in which said mass spectrometer incorporates a magnetic sector analyser.

38. Apparatus according to claim 11 further comprising means for heating said tube-like member.

* * * * *

UNITED STATES PATENT AND TRADEMARK OFFICE
CERTIFICATE OF CORRECTION

PATENT NO. : 4,542,293

DATED : September 17, 1985

INVENTOR(S) : John B. FENN et al

It is certified that error appears in the above-identified patent and that said Letters Patent is hereby corrected as shown below:

<u>IN THE BODY OF THE PATENT</u>

In column 1, on line 6, under the Title add the following:

--This invention was made with Government support under grants ET-78-G-01-34261 awarded by the Department of Energy, and ENG-7910843 awarded by the National Science Foundation. The Government has certain rights in this invention--.

Signed and Sealed this

Eighteenth Day of March 1986

[SEAL]

Attest:

DONALD J. QUIGG

Attesting Officer      Commissioner of Patents and Trademarks